April 1, 1947.  H. T. WINCHEL ET AL  2,418,284
DIFFERENTIAL VOLTAGE MEASURING CIRCUIT
Filed April 24, 1943
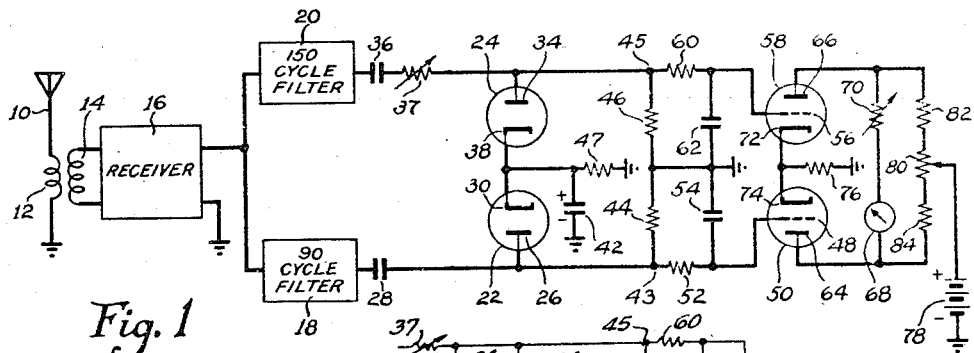
Fig. 1
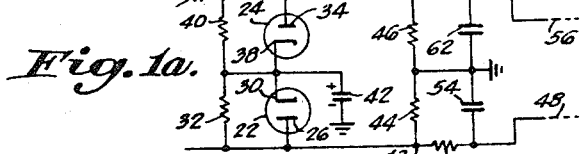
Fig. 1a.
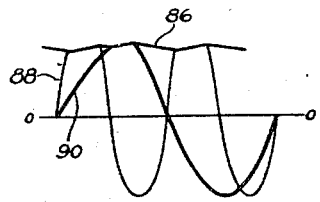
Fig. 2
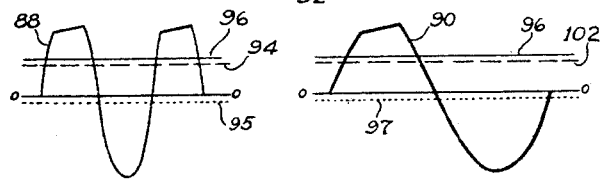
Fig. 3
Fig. 4
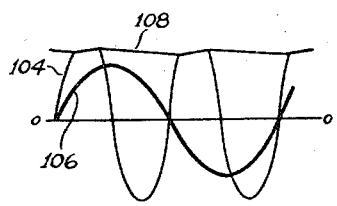
Fig. 5
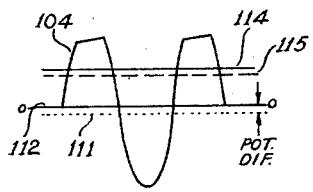
Fig. 6
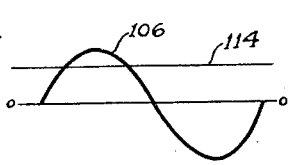
Fig. 7
INVENTOR
HENRY T. WINCHEL
BY JAMES A. WIPPERT
D. F. Doody
ATTORNEY Patented Apr. 1, 1947

2,418,284

UNITED STATES PATENT OFFICE 2,418,284

DIFFERENTIAL VOLTAGE MEASURING CIRCUIT

Henry T. Winchel and James A. Wippert, North Hollywood, Calif., assignors, by mesne assignments, to Bendix Aviation Corporation, South Bend, Ind., a corporation of Delaware Application April 24, 1943, Serial No. 484,454

5 Claims. (Cl. 171—95)

This invention relates to electrical measuring apparatus and relates more particularly to an improved apparatus for comparing the magnitudes of two voltages or currents.

It is an object of the invention to provide measuring apparatus of great accuracy for the detection of small differentials between alternating potentials.

Another object of the invention is to provide an electric tube circuit for measuring differentials between two alternating current potentials which is substantially independent of tube changes when the tubes are held within commercial limits or tolerances.

Still another object of the invention is to provide an improved indicator circuit for aircraft blind landing receivers in which the course is indicated by the relative percentage of modulation of a carrier in two overlapping lobes of transmitted radio energy.

A further object of the invention is to provide voltage differential measuring apparatus in which a preponderance of voltage in one branch reduces the response of voltage applied to another branch of the circuit.

The above objects and advantages of the invention are obtained by a novel dual rectifier circuit upon which the two voltages being compared are impressed, the potential of one of the rectifier elements being made a function of the amplitude of the impressed energy.

Other objects and advantages of the invention will be apparent in the following description and claims.

In the drawings forming a part of the specification:

Figure 1 is a schematic diagram illustrating the invention as a glide path receiver;

Figure 1a is a schematic diagram illustrating an alternative form of circuit connection for practicing the invention;

Figure 2 is a graph of the voltages of different frequencies appearing on the rectifier elements when the input voltages are balanced;

Figure 3 is a graph of one of the balanced voltages applied to its respective rectifier elements;

Figure 4 is a graph of the other balanced voltage applied to its respective rectifier;

Figure 5 is a graph of the voltages existing in the system when the input voltages are unbalanced;

Figure 6 illustrates graphically the greater of the two unbalanced voltages in the system; and Figure 7 illustrates graphically the lesser of the two unbalanced voltages in the system.

Referring to Figure 1, an antenna 10 is connected to a primary winding 12 and thence to ground. Coupled to primary winding 12 is a secondary winding 14 connected to the input terminals of a receiver 16. Receiver 16 contains the usual amplifying and demodulating circuit. Assuming that the received carrier is modulated with two different signal frequencies, there will be present in the output of receiver 16 these two frequencies. For purposes of illustration, these may be 150 cycle and 90 cycle signals. Two filters 18 and 20 are therefore connected to the receiver output, filter 18 passing 90 cycle notes and excluding all others, and filter 20 passing 150 cycle notes and excluding all others.

The voltages from filters 18 and 20 are impressed upon rectifier devices 22 and 24 respectively which are shown here as diode vacuum tubes. The connection from filter 20 is made through coupling condenser 36 and variable resistance 37 and the connection from filter 18 is made through a coupling condenser 28. Variable resistor 37 is used to initially adjust the system for a zero reading when the two voltages to be measured are balanced. The rectifier devices have cathodes 30 and 38 which are connected together and to ground through a condenser 42. The rectifier devices also have plates 26 and 34 which are connected to their respective filters.

A resistor 47 is connected between the cathodes 30, 38 and ground in shunt with capacitor 42. In an alternative form of the apparatus, shown in Figure 1a, resistors 32 and 40 may be connected in series between the anodes 34 and 26 with their junction point connected to the cathodes 30, 38. However, the understanding of the circuit operation is facilitated by considering only the circuit in which resistor 47 is connected in parallel with capacitor 42 and the following description of the operation of the circuit is made, assuming resistor 47 to be the only discharge path present across capacitor 42. The operating characteristics of the apparatus with resistors 32 and 40 in place, as in Figure 1a, will be discussed later.

The voltage waves across the rectifiers 22 and 24 are applied respectively to resistances 44 and 46 which may be of several megohms each, the opposite ends of which are connected to ground. The voltage wave across each rectifier 22 and 24 is connected to a filter combination which levels the voltage output to the mean value and are composed of resistance-capacity combinations 52, 54 and 60, 62 respectively. The output of the rectifier filters are fed into control grids 56 and 48 of triode amplifier tubes 58 and 50.

The tubes 58 and 50 have their cathodes 72 and 74 connected to ground through a biasing resistor 76. The tubes have plates 64 and 66 which are connected to the positive terminal of source 78 through resistors 80, 82 and 84. Resistor 80 is a balancing resistor to obtain a zero reading when the input voltages from band pass filters 18 and 20 are equal. Resistors 82 and 84 are load resistors for obtaining an IR drop to operate a meter 68 shunted across them. A variable resistor 70 is connected in series to vary the sensitivity of the meter, the sensitivity being the greatest with the least resistance.

Transmitted radio energy is received by the antenna 10 and demodulated and amplified in receiver 16. The output of receiver 16 is connected to two band pass filters, 18 and 20 which each pass one of two modulating signal waves. For purposes of illustration, filter 18 passes a 90 cycle signal and filter 20 passes a 150 cycle signal. These voltage waves are passed through condensers 28 and 36 to the plates 26 and 34 of diode rectifier tubes 22 and 24 respectively.

The graph of Figure 2 illustrates the time variation of the voltages appearing at anodes 26 and 34 when these voltages are equal in magnitude, the curve 88 representing the voltage of anode 34 with respect to ground, while the curve 90 represents the voltage of anode 26 with respect to ground. The diodes 22, 24 conduct whenever the anode is positive with respect to the associated cathode, thus if the apparatus is set in operation while capacitor 42 is discharged, charging pulses will flow into the capacitor causing the ungrounded terminal thereof to become positive. As the charging operation progresses, the cathodes 30, 38 are more positive than the associated anodes for a greater and greater portion of the time, until it is only when voltage waves 88 and 90 are at substantially their peak value that they overcome this bias to force a charging current into the capacitor 42. The equilibrium potential is reached when the amount of charge leaking away per unit time through the shunting resistor 47 is equal to the amount of charge supplied to the capacitor through the diodes during the peak excursions of the signal voltages. When the two signal voltages are equal, they supply equal amounts of charge to capacitor 42. The voltage variations across this capacitor are delineated by the trace 86. This line slopes downward during the interval that the capacitor charge is being dissipated through the shunt resistor, and slopes upward during the intervals when charge is received from one of the waves 88 or 90.

During the time that the diodes are non-conducting they may be regarded as an open circuit, and the signal voltage wave follows its usual course, but when the anode voltage of a diode exceeds the voltage of capacitor, a large charging current flows, which prevents the signal voltage from rising very much during this interval. As a result, the positive peaks of the signal waves are flattened or clipped. Normally, the integral of a sinusoidal wave, such as is supplied by the filters 18, 20, is zero, but the clipping process above referred to decreases the positive area included between the wave and the reference axis while leaving the negative area unaltered. As a result, the integral of the clipped wave is not zero, but has a negative value, the magnitude of this negative value being determined by the amount of charge delivered to the capacitor. As is well known, a capacitor connected to a source of electrical energy through a high resistance develops a potential proportional to the integral of the wave form of said source. In the apparatus disclosed herein, the integration of wave 88 appearing at anode 34 is performed by connecting the capacitor 62 to anode 34 through the resistor 60, and the integration of wave 90 appearing at anode 26 is performed by connecting the capacitor 54 to anode 26 through the resistor 52.

For ease in visualization, the clipped voltage wave 88 appearing between anode 34 and ground when the signal potentials are balanced is shown separately in Figure 3. As the negative area is greater than the positive area, the integral of this wave is the negative voltage represented by the dotted line 95 appearing below the reference axis. This is the voltage which appears across the capacitor 62 and is impressed on control grid 56. The significance of the remaining lines in this figure will be discussed later.

The clipped voltage wave 90 appearing between anode 26 and ground with balanced signal potentials is shown separately in Figure 4. Here, again, the negative area is greater than the positive area and the integral of the wave is represented by the dotted line 97 located negatively of the reference axis, this being the voltage which appears across the capacitor 54 and is impressed on the control grid 48.

Preparatory to the use of this apparatus, the circuits are energized, but no signal supplied to the filters 18 and 20. Meter 68 is of the type providing indications on either side of a zero point, and the slider of potentiometer 80 is now adjusted so that the meter pointer rests on the zero index. Equal alternating potentials at the pass frequencies of filters 18 and 20 are then impressed on the inputs of the respective filters from suitable test apparatus, and resistor 37 is adjusted so that the pointer of meter 68 once more rests on the zero index. The test potentials applied for the purpose of adjustment preferably have a value substantially equal to that normally encountered in practice. Under these conditions, the voltages existing at the various points of the circuit are those in Figures 2, 3 and 4 as just described. The output voltages from the integrator circuits are equal and are represented by the lines 95 and 97 in Figures 3 and 4 respectively. Since the anode circuit of the tubes 50 and 58 was previously adjusted to render the anode potentials equal, application of these equal voltages 95 and 97 to the control grids 56 and 48 respectively does not produce a meter deflection, as both anodes change in potential by like amounts.

Now assume the voltage from the filter 18 to decrease for some reason, while that from filter 20 remains constant or increases. Circuit operating potentials are now given by Figure 5, in which curve 104 depicts the voltage variations occurring at anode 34, curve 106 shows the voltage variations occurring at anode 26, and the trace 108 shows the voltages appearing across the capacitor 42. All the charging energy for the capacitor 42 is now supplied from wave 104, as the capacitor potential 108 at no time falls to a value permitting the diode 22 to conduct. Thus, only the peaks of wave 104 are clipped, while the symmetry of wave 106 on anode 26 is undisturbed. The waves are now impressed on the separate integrator circuits including capacitors 62 and 54 respectively. As shown in Figure 6, the negative areas of wave 104 exceed the clipped positive areas, and the potential cross the capacitor 62 is given by the dotted line 111, which is the integral or average of the wave. On the other hand, the symmetry of the wave 106 is undisturbed because of the desensitizing of the diode 22 by the high potential across capacitor 42 developed by the wave 104 of greater amplitude. Its average or integral is therefore zero and coincides with the reference axis in Figure 7. A negative voltage 111 therefore appears on the grid 56 of tube 58, while no signal generated bias voltage appears on grid 48 of tube 50. The total potential difference between control grids 48 and 56 is thus equal to the value of voltage 111. The negative voltage 111 applied to control grid 56 diminishes the anode current flowing through tube 58 which causes anode 66 of tube 58 to become positive with respect to anode 64 of tube 50 with consequent deflection of the meter 68. The wave 104 has not only developed negative bias operating the amplifier tube 58, but also, through the action of capacitor 42, has prevented the development of negative bias which would affect amplifier tube 50, thereby presenting a change in the current through the latter tube which would be in a direction decreasing the amplitude of the deflection of meter 68 for a given unbalance in the output voltages of filters 18 and 20. The operation of the system for the case where the voltage 106 exceeds voltage 104 is obviously the inverse of the mode previously described.

During the installation, a certain degree of unbalance is chosen as that value which should produce full scale deflection of meter 68 to one side or the other of zero. Voltages unbalanced in this degree are then impressed on filters 18 and 20, after the apparatus has been set up as previously described, and resistor 70 adjusted for the desired meter deflection.

If it be desired to increase the sensitivity to voltage unbalance in the presence of strong signals, the alternative provision of the discharge path for capacitor 42 through resistors 32 and 40 shown in Figure 1a, may be incorporated, eliminating resistor 47 or increasing its resistance, as desired. With the apparatus connected in this manner, the voltages on grids 48 and 56 are increased positively by an amount corresponding to the distance between the reference axis and line 96 in Figures 3 and 4, and by an amount corresponding to the distance between the reference axis and line 114 in Figures 6 and 7. The numerical value of the positive grid voltage introduced in either case is secured by multiplying the voltage across capacitor 42 by the ratio of resistance 46 to the sum of resistances 40 and 46. When the two branch circuits are symmetrical, as is normally the case, the voltage thus introduced is equal for both tubes 50 and 58. As the amount of positive voltage introduced is determined by the input signal amplitudes, the unbalance sensitivity of this system is enhanced in the presence of large signals because of the increase in mutual conductance accompanying more positive grid voltages. This arrangement, however, does not change the potential difference existing between the control grids of tubes 50 and 58. The actual potentials applied to the grids of the direct current amplifier tubes 50 and 58 for the case of balanced input potentials are shown by the dashed line 94 in Figure 3 and the dashed line 102 in Figure 4, the former indicating the potential on control grid 56 while the latter shows the potential on control grid 48. With unbalanced inputs, the potential on control grid 56 is given by the dashed line 115 in Figure 6, the potential on control grid 48 remaining at the direct current bias value 114 contributed by the discharge of capacitor 42 through the resistor network.

When this apparatus is connected to the output of a blind landing receiver responsive to the differently modulated intermeshing patterns determining the desired approach, it affords a quite sensitive, accurate indication of the relative intensities of the two modulation frequencies, whose balance is substantially undisturbed by the substitution of new tubes in the positions of tubes 50 and 58, so long as the substitute tubes are within the normal commercial limits. This is due in large measure to the reduction in the total range of grid potentials impressed on the tubes, without at the same time impairing the differential sensitivity.

The cathodes of the tubes employed in Figures 1 and 1a rely upon thermionic emission for their operation and are brought to the required operating temperature by associated heaters which have been omitted from the diagram for the sake of simplicity, since any of the well known heater energizing circuits may be employed.

It will be obvious that many changes and modifications may be made in the invention without departing from the spirit thereof as expressed in the foregoing description and in the appended claims.

We claim:

1. In a system responsive to voltage differentials, a first source of voltage, a second source of voltage, a capacitor, a unilateral impedance connected between said first source and said capacitor, a second unilateral impedance connected between said second source and said capacitor, means for integrating the voltage wave appearing across said first mentioned unilateral impedance, means for integrating the voltage wave appearing across said second mentioned unilateral impedance, and means for comparing the magnitude of said integrated voltage waves.

2. In a system responsive to voltage differentials, a branch circuit including a unilateral impedance, a second branch circuit including a unilateral impedance, means for impressing alternating current electrical energy on each of said branch circuits, means for deriving a potential proportional to the peak amplitude of the greater voltage applied to said branch circuits and controlling the operation of said unilateral impedances therewith, means for integrating the voltage wave appearing across said first mentioned unilateral impedance, means for integrating the voltage wave appearing across said second mentioned unilateral impedance, and means for comparing the magnitude of said integrated voltage waves.

3. In a system responsive to voltage differentials, a first source of voltage, a second source of voltage, each of said sources having a common terminal and an independent terminal, a capacitor having one terminal connected to said common terminal, a resistor connected in shunt with said capacitor, a unilateral impedance connected between the independent terminal of said first source and the other terminal of said capacitor, a second unilateral impedance connected between the independent terminal of said second source and said other terminal of said capacitor, integrating means connected to the source side of each of said unilateral impedances and to said common terminal, and indicating means responsive to the difference in the outputs of said integrating means.

4. In a system responsive to voltage differentials, a first source of voltage, a second source of voltage, each of said sources having a common terminal and an independent terminal, a capacitor having one terminal connected to said common terminal, a resistor connected in shunt with said capacitor, a unilateral impedance connected between the independent terminal of said first source and the other terminal of said capacitor, a second unilateral impedance connected between the independent terminal of said second source and said other terminal of said capacitor, a series connected resistor and capacitor connected between the source side of said first mentioned unilateral impedance and said common terminal, a series connected resistor and capacitor connected between the source side of said second mentioned unilateral impedance and said common terminal, and indicating means responsive to the difference in potential across said last mentioned capacitors.

5. In apparatus for the determination of the relative potential of two alternating voltage waves, means for rendering the greater of the two waves asymmetrical leaving the other of said waves substantially unaltered in form, means for impressing said asymmetric wave on a circuit including a series connected resistor and capacitor, means for impressing said unaltered wave on a circuit including a series connected resistor and capacitor, and indicating means responsive to the difference in the potentials across said capacitors.

HENRY T. WINCHEL.
JAMES A. WIPPERT.

REFERENCES CITED

The following references are of record in the file of this patent:

UNITED STATES PATENTS

| Number | Name | Date |
| --- | --- | --- |
| 1,985,095 | Hoare | Dec. 18, 1934 |
| 2,295,482 | Wunsch | June 9, 1942 |
| 2,300,198 | Brown | Oct. 27, 1942 |
| 2,309,560 | Welty | Jan. 26, 1943 |
| 2,140,662 | Zuschlag | Dec. 20, 1938 |
| 2,160,663 | Jensen | May 30, 1939 |
| 2,176,742 | La Pierre | Oct. 17, 1939 |
| 2,183,399 | Heising | Dec. 12, 1939 |
| 2,188,830 | Clark et al. | Jan. 30, 1940 |
| 2,245,717 | Roberts | June 17, 1941 |
| 2,281,995 | Purington | May 5, 1942 |
| 2,217,477 | Gulliksen | Oct. 8, 1940 |
| 1,827,590 | Kline | Oct. 13, 1931 |
| 1,867,264 | Hyland | July 12, 1932 |
| 2,022,459 | Chromy | Nov. 26, 1935 |
| 2,038,873 | Purington | Apr. 28, 1936 |
| 2,207,540 | Hansell | July 9, 1940 |
| 2,334,704 | Hilferty | Nov. 23, 1943 |